United States Patent [19]

Mena

[11] Patent Number: 4,587,282

[45] Date of Patent: May 6, 1986

[54] POLYESTER LAMINATING COMPOSITIONS WITH IMPROVED INTERLAMINAR ADHESION

[75] Inventor: Peter L. Mena, Guelph, Canada

[73] Assignee: Fiberglas Canada Inc., Sarnia, Canada

[21] Appl. No.: 622,161

[22] Filed: Jun. 19, 1984

[30] Foreign Application Priority Data

Feb. 10, 1984 [CA] Canada ................................. 447196

[51] Int. Cl.$^4$ .......................... C08K 5/10; C08K 5/20; C08K 5/01; C08L 67/06
[52] U.S. Cl. .................................. 523/508; 523/511; 523/518; 523/521; 523/527
[58] Field of Search ............... 523/511, 518, 527, 508, 523/521

[56] References Cited

U.S. PATENT DOCUMENTS

| | | |
|---|---|---|
| 3,331,796 | 7/1967 | Gilbert et al. . |
| 3,725,335 | 4/1973 | Lefebvre ............................ 523/523 |
| 3,932,332 | 1/1976 | Douglas et al. . |
| 4,032,494 | 6/1977 | Gentry ................................ 523/523 |
| 4,285,845 | 8/1981 | Russell . |
| 4,296,009 | 10/1981 | Kerle . |
| 4,336,169 | 6/1982 | Hamer et al. . |
| 4,347,170 | 8/1982 | Sep et al. . |
| 4,387,171 | 6/1983 | Russell ................................ 523/518 |

OTHER PUBLICATIONS

Data sheet for Component Byk W-980, a trademark of Byk-Mallinckrodt, Chemische Produkte GmbH.

*Primary Examiner*—Allan M. Lieberman
*Attorney, Agent, or Firm*—Parkhurst & Oliff

[57] ABSTRACT

Polyester laminating compositions useful in the production of polyester laminates with improved interlaminar adhesion and a method of preparing same are described. The polyester laminating compositions include as adhesion promoters a polyvinyl acetate component or a polyvinyl acetate component in combination with at least one salt of a long chain polyaminoamide and a high molecular weight ester.

17 Claims, No Drawings

POLYESTER LAMINATING COMPOSITIONS WITH IMPROVED INTERLAMINAR ADHESION

BACKGROUND OF THE INVENTION

The invention relates to polyester laminating compositions useful in the production of polyester resin laminates with improved interlaminar adhesion and a method of preparing same. More particularly, the invention relates to wax-containing polyester laminating compositions which include as adhesion promoters a polyvinyl acetate component or a polyvinyl acetate component in combination with at least one salt of a long chain polyaminoamide and a high molecular weight ester.

Polyester resins have been used for various purposes including the production of laminated articles. In the manufacture of such laminated articles a plurality of layers of polyester resin compositions are successively superimposed. Usually the article is reinforced by incorporating a reinforcing filler such as glass fiber or the like. Typically, the filler may be applied seprately as a mat or fabric which is impregnated with the liquid polyester resin composition or it may be dispersed as short strands in the composition.

In the manufacture of fiber-reinforced polyester resin laminates it is important that the adhesion between superimposed layers is adequate. Good interlaminar adhesion is often difficult to obtain with wax-containing polyester laminating systems, i.e. polyester laminating compositions which include a waxy substance for the purpose of decreasing the evaporation of volatile cross-linking compounds in the compositions, since such waxy substances tend to interfere with the interlaminar properties of these systems.

The unsaturated, polymerizable polyesters which are generally used in the production of such laminates are substantially condensation products of dicarboxylic acids and diols. Generally the dicarboxylic acid component consists primarily of an unsaturated acid and/or anhydride like maleic acid or fumaric acid. A portion of the unsaturated acid or anhydride may be substituted with a saturated acid and/or anhydride such as orthophthalic acid, isophthalic acid, adipic acid or the like. The diol component is normally selected from diols such as ethylene glycol, propylene glycol, diethylene glycol, dipropylene glycol, neopentyl glycol and mixtures thereof.

In addition to the polyester component, polyester resin compositions contain volatile reactive monomeric material which is copolymerizable with the unsaturated polyester and which also acts as a solvent for the unsaturated polyester improving the workability of the composition, in particular, the viscosity. Examples of suitable volatile monomeric materials include styrene, vinyl toluene, alpha-methyl styrene, methacrylic acid and methyl methacrylate.

The cure of unsaturated polyester resin laminating compositions is commonly catalysed by free radical catalysts such as suitable peroxides. The cure can be accelerated by further inclusion of cure promoters.

During application of the polyester resin composition and before completion of the polymerization a portion of the volatile monomer, which in most cases is styrene monomer, evaporates. This may lead to insufficient cross-linking at the surface of the resin resulting in an undercured tacky surface. Moreover, evaporation of substances such as styrene is environmentally undesirable. To decrease the evaporation waxy substances such as paraffin wax, montan wax, carnauba wax and the like are usually added to the polyester resin composition. However, even though generally only small amounts of wax are required to reduce the evaporation of volatile monomer materials, the incorporation of wax tends to interfere with the interlaminar adhesion between layers in the cured laminated articles formed from such wax-containing compositions.

Several ways of overcoming this drawback have been proposed but have not always been completely satisfactory. Thus it has been suggested to improve interlaminar adhesion by incorporating into the polyester resin composition compounds such as maleic acid derivatives (U.S. Pat. No. 4,336,169 issued June 22, 1982), unsaturated vinyl compounds (U.S Pat. No. 4,285,845 issued Aug. 25, 1981), an alkylaromatic compound or mono-alcohol (U.S. Pat. No. 4,347,170 issued Aug. 31, 1982), tertiary monoamine (U.S. Pat. No. 4,296,009 issued Oct. 20, 1981), etc.

SUMMARY OF THE INVENTION

It has now been found that incorporation of small amounts of polyvinyl acetate into wax-containing polyester resin compositions can greatly improve the interlaminar adhesion properties of the cured resin while substantially retaining the desirable suppression of evaporation of volatile monomer material. Polyvinyl acetate surprisingly acts as an adhesion promoter. Particularly in highly reactive resins, i.e. resins having a relatively high content of maleic or an equivalent acid, addition of small amount of polyvinyl acetate improves the interlaminar adhesion of the cured resin considerably.

For less reactive polyester resin compositions it is often advantageous to incorporate not only small amounts of polyvinyl acetate but also small amounts of at least one salt of a long chain polyaminoamide and a high molecular weight ester as adhesion promoters. The addition of such a salt by itself to a wax-containing polyester laminating composition does not generally influence either the interlaminar adhesion or the rate of evaporation of the volatile monomeric material. Unexpectedly, however, addition of such salts to a wax-containing polyester laminating composition which also contains small amounts of polyvinyl acetate further improves the interlaminar adhesion of the resulting resins without having any substantial effect on the evaporation of the volatile monomeric material. This effect is especially noticable in less reactive polyester laminating compositions commonly used for laminating purposes.

In one aspect of the invention there are provided polyester laminating compositions comprising an unsaturated polyester, including a volatile reactive monomer as crosslinking agent and a wax for reducing evaporation of the volatile reactive monomer, 0.1 to 4% by weight of polyvinyl acetate, based on the total weight of the composition, and 0 to 2% by weight of at least one salt of a long chain polyaminoamide and a high molecular weight ester.

In another aspect of the invention there is provided a method of producing laminating compositions exhibiting improved interlaminar adhesion properties.

DETAILED DESCRIPTION

According to the invention the failure of unsaturated polyester laminating compositions, containing wax for suppressing the evaporation of volatile material, to develop interlaminar adhesion as great as that of similar compositions without wax can be at least partially overcome by incorporating at least about 0.1% by weight of polyvinyl acetate based on the total weight of the polyester resin composition. As previously indicated, the incorporation of polyvinyl acetate into less reactive wax-containing polyester laminating compositions is not always as effective in increasing the resins' interlaminar adhesion as is the incorporation of polyvinyl acetate into highly reactive polyester laminating compositions. However, interlaminar adhesion properties of most commonly used polyester laminating compositions can be considerably enhanced by the addition of at least 0.1% by weight of polyvinyl acetate based on the total weight of the polyester resin composition in combination with at least 0.1% by weight of salts of a long chain polyaminoamide and a high molecular weight ester.

Polyesters particularly useful for preparing polyester laminating compositions according to the invention include condensation products of a mixture in which the unsaturated acids are present in an amount of 25 to 100 mole % of the total amount of dicarboxylic acid component and in which the diol component is made up of propylene glycol or a mixture of propylene glycol and ethylene glycol and/or diethylene glycol.

After condensation the polyester is dissolved in a copolymerizable volatile reactive monomeric material. Preferably, 80 to 100% of the volatile reactive monomer consists of styrene. Alpha-methyl styrene may be added in an amount of up to 5%. Methacrylic acid may also be included.

To enhance storage stability compounds such as hydroquinone, benzoquinone, para-tertiary butyl catechol and the like may be added to the polyester.

Thixotropic agents such as fumed silica may be added in an amount of generally less than 2%, preferably 0.5 to 1.5%, along with promoters such as soluble salts of cobalt or copper, dimethyl and/or diethyl aniline and the like.

The wax added to reduce evaporation of the volatile reactive monomer is advantageously a paraffin wax. Preferred are paraffin waxes with melting points of between about 57° and 64° C., in particular paraffin waxes with melting points of about 60° C.

Optionally, dyes or pigments and the like may also be added.

Advantageously the polyvinyl acetate added to improve interlaminar adhesion of wax-containing polyester laminating compositions according to the invention has a relatively low molecular weight. Lower molecular weight polyvinyl acetate generally dissolves more readily and affects the viscosity of the finished product to a lesser extent than higher molecular weight polyvinyl acetate. Preferably, the polyvinyl acetate has a molecular weight of between about 35,000 and 260,000, more preferably of between about 80,000 and 160,000. In cases when the final resin composition has a comparatively high viscosity it is desirable to use polyvinyl acetate having a relatively low molecular weight.

The salts of a long chain polyaminoamide and a high molecular weight ester which are useful according to the invention include materials such as BYK W-980 which is a trademark of Byk-Mallinckrodt. BYK W-980 is a mixture comprising 80% of a salt of a long chain polyaminoamide and an ester of linoleic acid, said salt having a molecular weight approximately three times that of the oleylamine salt of linoleic acid, and 20% ethylene glycol monobutyl ether (butyl CELLOSOLVE (trademark)).

In a brochure from the manufacturer dated June 1979 the following physical data for BYK W-980 are listed:

| | |
|---|---|
| Specific gravity 20/4° C. | 0.99 g/cm$^3$ |
| Weight/U.S. Gal. | 8.26 lbs/Gal. |
| Flash Point (Pensky-Martens) | 77° C. |
| Effective Substance ASTM D 1644 Method-B | 80% |
| Appearance | Clear, light yellow liquid |

In highly reactive polyesters according to the invention the dicarboxylic acid component generally contains a higher proportion of unsaturated acids than in the general purpose polyesters, i.e. the unsaturated acids are present in an amount of 50 to 100 mole % of the total amount of dicarboxylic acid component.

INTERLAMINAR ADHESION TEST METHOD

To evaluate the adhesion or bonding properties of glass fiber reinforced polyester laminating compositions a test developed by British Industrial Plastics is applied.

Required Materials

Chopped strand glass fiber mat 450 g/m$^2$;
Methylethylketone peroxide catalyst;
Satin weave cloth (a Bay Mills Style 137) 300 g/m$^w$;
MYLAR (trademark of DuPont) or cellophane parting film.

Procedure (1) Cut 4 pieces of mat and 2 pieces of satin weave cloth about 30 cm×30 cm each.

(2) Prepare a "primary" laminate of a flat, mold released surface by applying 2 plies of mat, and 1 ply of satin weave cloth in that order, impregnated with the appropriate test resin properly catalyzed. The resultant laminate should contain 25% to 30% glass fiber. Approximately 5% resin loss in the paint brush, roller, etc. can be anticipated.

(3) Allow this "primary" laminate to cure for four days (96 hours) at normal shop temperature (this time span represents the potential situation where a long week-end may elapse before any additional laminate can be applied).

(4) At the end of the four day (96 hours) curing period, place a 10 cm wide strip of Mylar or Cellophane film onto the satin weave cloth surface at one edge so that about ¾ of the width of the strip is on the laminate and the balance overhangs onto the workbench. The film can be secured to the laminate with a small amount of catalyzed resin.

(5) Now apply a "secondary" laminate to the satin weave cloth surface of the "primary" surface, including the area covered by the parting film. For this purpose lay down the remaining piece of satin weave cloth first, and then the two pieces of mat.

(6) Allow the "secondary" laminate to cure overnight.

(7) Allow the complete laminate, "primary" and "secondary", to post-cure at 40° C. for 18 hours. Then allow to cool.

(8) To test the laminate for interlaminar adhesion remove the parting film insert and separate the "primary" and "secondary" laminates using a wedge.

(9) Inspect the separated surfaces of the laminate for "whitening". The higher the percentage of the surface area which exhibits the "whitening phenomenon", the higher is the interlaminar adhesion. To "pass" the adhesion test, both of the separated surfaces must exhibit "whitening" over at least 85% of their surface areas. Approximately 100% whitening was rated "excellent", about 90 to 100% whitening was rated "very good", about 80 to 90% whitening was rated "good" and about 60 to 80% whitening was rated "fair".

"PAN-TEST" FOR STYRENE LOSS 300 grams of the resin to be tested is mixed with methylethylketone peroxide as catalyst. Then 290 grams are transferred to a tared pan (20×30 cm) on a balance and the weight loss at ambient temperature is recorded as percent of the resin or in $g/m^2$.

The following examples further illustrate the invention.

EXAMPLE 1

Laminating compositions were formulated using Fiberglas Canada Inc.'s polyester resin composition VIBRIN F-1072 (trademark) which is a highly reactive, high heat distortion resin suitable for laminating. The resin contains as dicarboxylic acid component 80 mole % maleic acid and 20 mole % phthalic acid and as diol component 61 mole % propylene glycol and 39 mole % dipropylene glycol.

To this resin 0.06% by weight paraffin wax having a melting point of about 60° C. was added. This wax-containing composition was used as standard. The standard composition was mixed with either 2% or 3% MOWILITH 30 (trademark of Hoechst). MOWILITH 30 is a solid polyvinyl acetate having an average molecular weight of about 110,000. Methylethylketone peroxide was added just before use. The styrene loss of the composition and the interlaminar adhesion of the cured resin were measured.

TABLE 1

| Samples | % Styrene Loss | Interlaminar Adhesion |
| --- | --- | --- |
| Standard | 1.62 | poor |
| Standard and 2% MOWILITH 30 | 2.00 | very good |
| Standard and 3% MOWILITH 30 | 2.20 | good |

The results of Table 1 show that the addition of polyvinyl acetate to the highly reactive wax-containing polyester resin composition improves the interlaminar adhesion of the resulting resin considerably while at the same time increasing the styrene loss to some extent.

EXAMPLE 2

Laminating compositions were formulated using Fiberglas Canada Inc.'s polyester resin composition VIBRIN F-1029 (trademark) which is a fast gelling, fast curing, low viscosity resin suitable for laminating. The resin contains as acid component 35 mole % maleic acid and 65 mole % phthalic acid and as diol component 73 mole % propylene glycol and 27 mole % diethylene glycol.

This wax-free composition was used as standard in two separate tests. To this standard composition there was added (a) 0.1% paraffin wax, (b) 0.1% paraffin wax and 1% MOWILITH 30, (c) 0.1% paraffin wax and 0.5% BYK W-980 (trademark of Byk-Mallinckrodt), or (d) 0.1% paraffin wax, 1% MOWILITH 30 and 0.5% BYK W-980. BYK W-980 is a mixture comprising 80% of a salt of along chain polyaminoamide and an ester of linoleic acid, said salt having a molecular weight approximately three times that of the oleylamine salt of linoleic acid, and 20% ethylene glycol monobutyl ether (butyl CELLOSOLVE (trademark)). The paraffin wax used had a melting point of about 60° C.

Methylethylketone peroxide was added just before use and the styrene loss and interlaminar adhesion were measured.

TABLE 2

| Sample | % Styrene Loss | Interlaminar Adhesion |
| --- | --- | --- |
| Standard | 2.14 | good |
| Standard and 1% MOWILITH 30 0.1% paraffin wax | 1.44 | borderline - good |
| Standard and 1% MOWILITH 30 0.5% BYK W-980 0.1% paraffin wax | 1.35 | excellent |

TABLE 3

| Sample | % Styrene Loss | Interlaminar Adhesion |
| --- | --- | --- |
| Standard | 2.41 | very good |
| Standard and 0.1% paraffin wax | 1.21 | fair |
| Standard and 0.1% paraffin wax 1.0% MOWILITH 30 | 0.93 | good |
| Standard and 0.1% paraffin wax 0.5% BYK W-980 | 0.93 | good |
|  | 1.17 | fair |
| Standard and 0.1% paraffin wax 1% MOWILITH 30 0.5% BYK W-980 | 1.10 | excellent |

The results of Tables 2 and 3 show the influence of the addition of wax, polyvinyl acetate and BYK W-980 separately and in combination on the interlaminar adhesion properties and on the styrene loss of the fast curing polyester resin. It follows that the addition of polyvinyl acetate to wax-containing resin improves the interlaminar adhesion while at the same time slightly reducing the styrene loss. The addition of BYK W-980 to the wax-containing resin does not substantially influence either the interlaminar adhesion or the styrene loss. The addition of polyvinyl acetate in combination with BYK W-980 to the wax-containing resin, on the other hand, greatly improves interlaminar adhesion without having any substantial effect on the styrene loss.

EXAMPLE 3

Laminating compositions were formulated using Fiberglas Canada Inc.'s polyester resin composition MIAPOL 2T1114 (trademark) which is a low viscosity, medium cure general purpose resin. The resin contains as acid component 35 mole % maleic acid and 65 mole % phthalic acid and as diol component 73 mole % propylene glycol and 27 mole % diethylene glycol.

This composition was used as standard. To the standard composition there was added either (a) 0.1% paraffin wax having a melting point of about 60° C. or (b) 0.1% paraffin wax, 1.0% MOWILITH 30 and 0.5% BYK W-980. Methylethylketone peroxide was added just before use and the styrene loss and interlaminar adhesion were measured.

TABLE 4

| Sample | % Styrene Loss | Interlaminar Adhesion |
|---|---|---|
| Standard | 3.27 | good |
| Standard and 0.1% paraffin wax | 0.896 | very poor |
| Standard and 0.1% paraffin wax 1.0% MOWILITH 30 0.5% BYK W-980 | 0.896 | good |

The results in Table 4 show that the addition of polyvinyl acetate in combination with BYK W-980 to the wax-containing all purpose resin increases the interlaminar adhesion without affecting the styrene loss.

COMPARATIVE EXAMPLES

Laminating compositions were formulated using the environmental resin from Ashland, which is available under the trademark Ashland C520 which is based on U.S. Pat. No. 4,285,845 to Scott Bader Company Ltd., and Fiberglas Canada Inc.'s polyester resin composition MIAPOL J-446 which is a general purpose resin based on MIAPOL 2T1114 and which contains 0.1% paraffin wax, 1.0% MOWILITH 30 and 0.5% BYK W-980.

TABLE 5

| Sample | Styrene Loss % | Styrene Loss g/m² | Interlaminar Adhesion % |
|---|---|---|---|
| Ashland C520 (sample 1) | 1.72 | 65.9 | 75 |
| Ashland C520 (sample 2) | 2.28 | — | — |
| MIAPOL J-446 | 1.58 | 60.8 | 90–95 |

The results of Table 5 show that the interlaminar adhesion of an all purpose polyester resin to which polyvinyl acetate and BYK W-980 were added is higher than the interlaminar adhesion exhibited by a commercial embodiment of the resins described in U.S. Pat. No. 4,285,845 which contains as adhesion promoter lauryl methacrylate, vinyl decanoate or related compounds. At the same time the loss of styrene was lower in the resin according to the invention than in the Ashland C520 resin.

The embodiments of the invention in which an exclusive property or privilege is claimed are defined as follows:

1. A polyester laminating composition comprising:
   (a) a highly reactive unsaturated polyester including a volatile reactive monomer as cross-linking agent and a wax for reducing evaporation of said volatile reactive monomer; and
   (b) 0.1% to 4% by weight, based on the total weight of the composition, of a polyvinyl acetate having a molecular weight of between about 35,000 and 260,000.

2. A composition as in claim 1 wherein the polyester includes a dicarboxylic acid component comprising 50 to 100 mole % of unsaturated acids.

3. A composition as in claim 2 wherein the wax is a paraffin wax.

4. A composition as in claim 2 wherein said component (b) is present in an amount of about 0.5 to 3% by weight based on the total weight of the composition.

5. A polyester laminating composition comprising:
   (a) an unsaturated polyester including a volatile reactive monomer as a cross-linking agent and a wax for reducing evaporation of said volatile reactive monomer;
   (b) 0.1% to 4% by weight, based on the total weight of the composition, of a polyvinyl acetate having a molecular weight of between about 35,000 and 260,000; and
   (c) 0.1% to 2% by weight, based on the total weight of the composition, of a mixture of 80% of a salt of a long chain polyaminoamide and an ester of linoleic acid, said salt having a molecular weight approximately three times that of the oleylamine salt of linoleic acid and 20% of ethylene glycol monobutyl ether.

6. A composition as in claim 5 wherein the volatile reactive monomer is selected from the group consisting of styrene, alpha-methyl styrene, vinyl toluene, methacrylic acid and methyl methacrylate.

7. A composition as in claim 5 wherein the volatile reactive monomer is styrene.

8. A composition as in claim 5 wherein the wax is a paraffin wax.

9. A composition as in claim 5 wherein the polyvinyl acetate has a molecular weight of between about 80,000 and 160,000.

10. A composition as in claim 5 wherein said component (b) is present in an amount of about 0.5 to 3% by weight based on the total weight of the composition.

11. A composition as in claim 5 wherein said component (b) is present in an amount of about 1% by weight based on the total weight of the composition.

12. A composition as in claim 1 further containing a mineral fiber filler.

13. A method of increasing the interlaminar adhesivity of a laminating composition including an unsaturated polyester, a volatile reactive monomer as cross-linking agent and a wax for reducing evaporation of said volatile reactive monomer, said method comprising incorporating into the laminating composition from 0.1% to 4% by weight, based on the total weight of the composition, of a polyvinyl acetate having a molecular weight of between about 35,000 and 260,000 and from 0.1% to 2% by weight, based on the total weight of the composition, of a mixture of 80% of a salt of a long chain polyaminoamide and an ester of linoleic acid, said salt having a molecular weight approximately three times that of the oleylamine salt of linoleic acid and 20% ethylene glycol monobutyl ether.

14. A method according to claim 13 wherein from 0.5% to 3% by weight, based on the total weight of the composition, of said polyvinyl acetate, is incorporated into said composition.

15. A method according to claim 13 wherein about 1% by weight, based on the total weight of the composition, of said polyvinyl acetate, is incorporated into said composition.

16. A method according to claim 13 wherein from about 0.3% to 1% by weight, based on the total weight of the composition, of said mixture is incorporated into said composition.

17. A method according to claim 16 wherein about 0.5% by weight, based on the total weight of the composition, of said mixture is incorporated into said composition.

* * * * *